(12) United States Patent
Fanning et al.

(10) Patent No.: US 7,836,433 B2
(45) Date of Patent: Nov. 16, 2010

(54) ANALYZING BINARY CODE

(75) Inventors: Michael C. Fanning, Redmond, WA (US); Nicholas P. Guerrera, Seattle, WA (US); Jeffrey van Gogh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1331 days.

(21) Appl. No.: 11/340,190

(22) Filed: Jan. 26, 2006

(65) Prior Publication Data

US 2007/0174817 A1 Jul. 26, 2007

(51) Int. Cl.
G06F 9/44 (2006.01)
(52) U.S. Cl. .................................. 717/126; 717/120
(58) Field of Classification Search ................. 717/124
See application file for complete search history.

(56) References Cited

U.S. PATENT DOCUMENTS

| | | | |
|---|---|---|---|
| 5,749,079 A | | 5/1998 | Yong et al. |
| 5,864,837 A | * | 1/1999 | Maimone ........................... 1/1 |
| 5,987,254 A | * | 11/1999 | Subrahmanyam ........... 717/155 |
| 7,065,743 B2 | * | 6/2006 | Blais et al. .................. 717/108 |
| 7,503,037 B2 | * | 3/2009 | Banerjee et al. ............ 717/124 |
| 2001/0044794 A1 | | 11/2001 | Nasr et al. |
| 2002/0198874 A1 | | 12/2002 | Nasr et al. |
| 2003/0037177 A1 | | 2/2003 | Sutton et al. |
| 2004/0083464 A1 | * | 4/2004 | Cwalina et al. .............. 717/126 |
| 2005/0108562 A1 | * | 5/2005 | Khazan et al. ............... 713/200 |

OTHER PUBLICATIONS

Reverse Engineering Meets Data Analysis Periklis Andritsos and Renee J. Miller Proceedings of the 9th International Workshop on Program Comprehension p. 157 Year of Publication: 2001.*
Pluggable Verification Modules: An Extensible Protection Mechanism for the JVM Philip W. L. Fong OOPSLA'04, Oct. 24-28, 2004.*
Model Checking x86 Executables with CodeSurfer/x86 and WPDS++ G. Balakrishnan et al in Proc. Computer Aided Verification (CAV), Jul. 2005.*
NeD: The Network Extensible Debugger Paul Maybee Summer '92 USENIX, pp. 145-156, Jun. 1992.*

* cited by examiner

*Primary Examiner*—Emerson C Puente
*Assistant Examiner*—Paul Mills
(74) *Attorney, Agent, or Firm*—Workman Nydegger

(57) ABSTRACT

The present invention extends to methods, systems, and computer program products for analyzing binary code. Binary code is received. Code analysis rules indicative of a query related to the functionality of the binary code are received. The query is implemented in analysis code configured to determine results of the query. It is determined if valid cached results for the query are cached in a results store. If not, the analysis code is invoked to determine the results for the query and the results are cached. Accordingly, when the query is received in the future, the results can be accessed from the results store without having to invoke the analysis code to determine the results. If so, the cached results are retrieved so as to avoid further invocation of the analysis code. The results are returned.

18 Claims, 2 Drawing Sheets

ANALYZING BINARY CODE

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, Web browsing, and printing documents) include the communication (e.g. the exchange of electronic messages) between a number of computer systems and/or other electronic devices via wired and/or wireless computer networks.

Accordingly, there are an enormous variety of functions and applications that may be implemented by a general purpose computing system in response to the execution of a software application. The utility and functionality of the computing system does, however, rely on the proper coding of the source code that was compiled or interpreted into the binary instructions that are actually executed by the processor. If there is a coding or design error (often referred to as a "bug"), this will often result in a deviation from expected behavior.

Further, the creativity of software programmers and designers has led to increasingly complex and powerful software applications. As the complexity of the software application increases, so often does the potential for coding and design errors that can cause unexpected performance deviations. Thus, it is almost inevitable that unexpected performance deviations will occur. Accordingly, in most development environments, efforts are made to reduce the number of unexpected performance deviations in developed software.

Efforts to reduce unexpected performance deviations can include performing code analysis to attempt to identify unexpected performance deviations and remove them before code is released to customers. In some code analysis mechanisms, a local (e.g., client-side) analysis occurs against in-development binaries compiled by a programmer. This local approach brings code analysis results close to the development process and is effective for preventing correctness issues from ever being checked into code. This is beneficial since identifying problems as early as possible in the development cycle reduces the amount of resources consumed to correct the problems.

However local analysis is necessarily constrained as it must execute in reasonable time. That is, a developer must get analysis results for incorporation back into the code in a timely manner. Failure to get results in a timely manner essentially causes the developer to spending more time waiting for analysis results than developing. Thus, at least these time constraints limit the depth and the complexity of the local analysis that can occur. For example, local analysis mechanisms often limit data flow capabilities to an intra-procedural analysis (i.e., within a procedure) and do not allow inter-procedural analysis (i.e., between procedures). As a result, local code analysis cannot typically be used to perform expensive analysis that crosses procedure boundaries.

In other code analysis mechanisms, a remote (e.g., server-based) analysis occurs against compiled code that has been checked into source control. Some analysis is resource intensive and can take extended periods of time (e.g., hours) to complete. In some environments, off loading this type of analysis to remote (and potentially more powerful) computers is beneficial. Having a remote computer system perform the analysis frees up a developer's computer for use in developing code without having resource intensive analysis consuming resources.

However, remote analysis can take significantly longer to generate results than local analysis, for example, often occurring over night. Thus, remote analysis has more latency in the generation of results as compared to local code analysis. In many development environments, a developer cannot wait several hours in order to receive results on a check-in (e.g., that might require further modification based on those results).

Further, to implement remote code analysis, developers may be required to develop infrastructure (e.g., a web application managing a database of results) for managing problems through investigation and resolution. Remote code analysis also prevents developers from performing code analysis (e.g., inter-procedural analysis) to analyze a prospective set of changes in advance of check-in. Additionally, existing remote code analysis technology is typically too expensive to utilize during the development process. Accordingly, in some development environments developers are relegated to using less powerful local code analysis due to time and cost constraints.

BRIEF SUMMARY

The present invention extends to methods, systems, and computer program products for analyzing binary code. In some embodiments, binary code and code analysis rules are received. At least one code analysis rule is indicative of a query related to the functionality of the binary code. The query is implemented in analysis code configured to determine results of the query. It is determined that that valid results for the query are not cached in a results store. In response, the analysis code is invoked to determine the results for the query. The results are cached in the results store such that when the query is received in the future the results can be accessed from the results store without having to invoke the analysis code to determine the results. The results for the query are returned.

In other embodiments, binary code and code analysis rules are received. At least one code analysis rule is indicative of a query related to the functionality of the binary code. The query is implemented in analysis code configured to determine results of the query. It is determine that cached results for the query are cached in a results store. The cached results having been cached in the results store subsequent to an invocation of the analysis code used to determine the results of the query. It is determined that the results are valid. The cached results are retrieved so as to avoid further invocation of the analysis code. The cached results for the query are returned.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
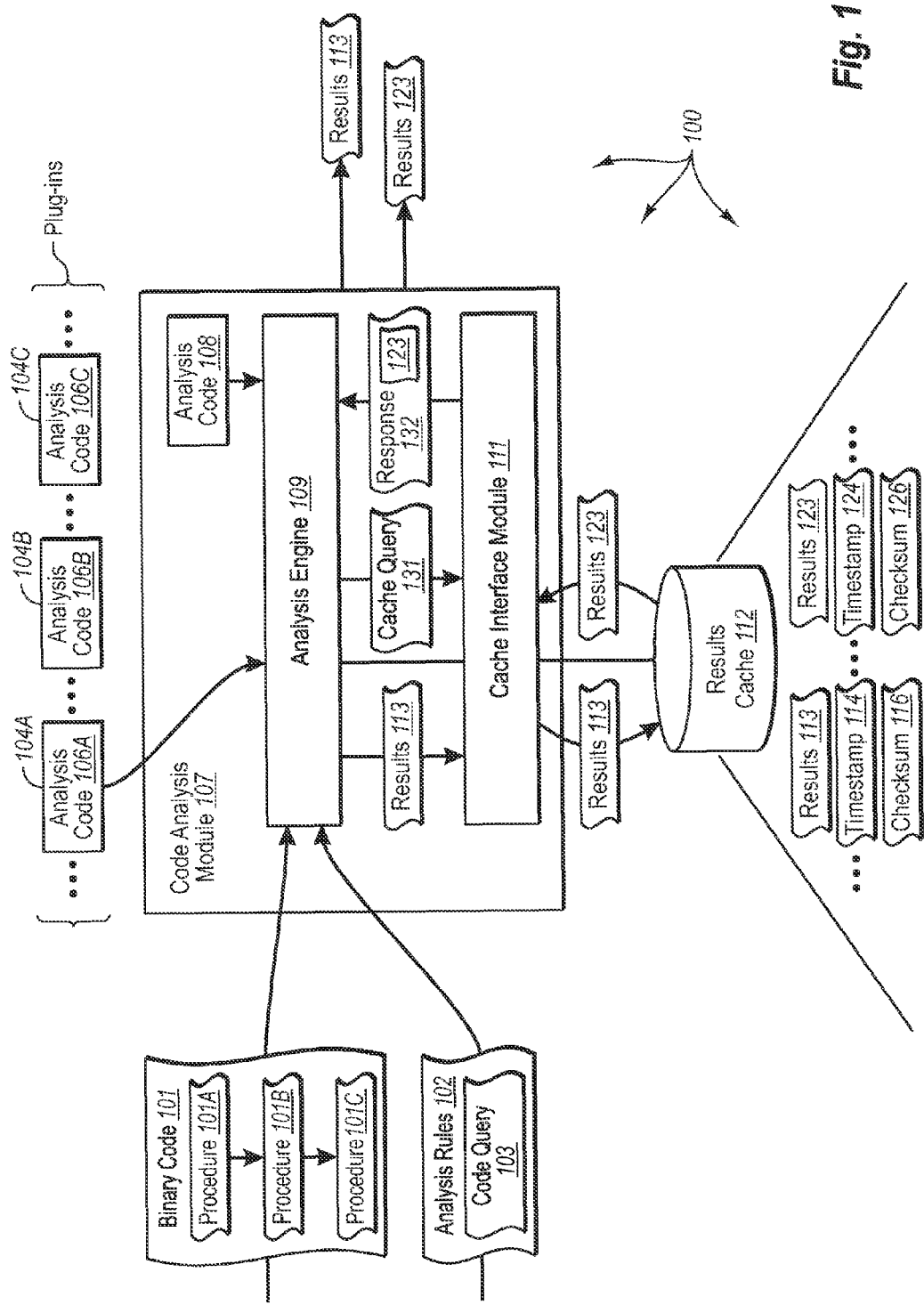
FIG. 1 illustrates an example computer architecture that facilitates analyzing binary code.

The present invention extends to methods, systems, and computer program products for analyzing binary code. In some embodiments, binary code and code analysis rules are received. At least one code analysis rule is indicative of a query related to the functionality of the binary code. The query is implemented in analysis code configured to determine results of the query. It is determined that that valid results for the query are not cached in a results store. In response, the analysis code is invoked to determine the results for the query. The results are cached in the results store such that when the query is received in the future the results can be accessed from the results store without having to invoke the analysis code to determine the results. The results for the query are returned.

In other embodiments, binary code and code analysis rules are received. At least one code analysis rule is indicative of a query related to the functionality of the binary code. The query is implemented in analysis code configured to determine results of the query. It is determine that cached results for the query are cached in a results store. The cached results having been cached in the results store subsequent to an invocation of the analysis code used to determine the results of the query. It is determined that the results are valid. The cached results are retrieved so as to avoid further invocation of the analysis code. The cached results for the query are returned.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise, computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example of a computer architecture 100 that facilitates analyzing binary code. Depicted in computer architecture 100 are various components including code analysis module 107, analysis engine 109, cache interface module 111, and results cache 112. Each of the various components can be connected to a network, such as, for example, a Local Area Network ("LAN"), a Wide Area Network ("WAN"), or even the Internet. Thus, the various components can receive data from and send data to other components connected to the network. Accordingly, the components can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network. The depicted components may be at the same computer system or distributed across a number of different computer systems.

Generally, code analysis module 107 is configured to analyze binary code (e.g., compiled source code) according to analysis rules. For example, code analysis module 107 can analyze binary code to calculate a closure of exceptions or result codes that can be returned by a function, calculate whether a call site can possibly return a memory allocation, calculate a call graph for a function, calculate constraints of variables and parameters, determine whether a value may or may not be NULL, aggregate security permissions (e.g., for managed code), etc.

Analysis engine 109 can receive binary code and corresponding analysis rules, for example, from another module that is requesting binary code analysis. Included in the analysis rules can be one or more code queries related to the functionality of the binary code. To implement a received code query against the binary code, the analysis engine can execute analysis code designed to generate results for the received code query.

Analysis code can be internal analysis code that is included in code analysis module 107. Alternately, analysis code can be external analysis code that is accessible to and can be loaded by code analysis module 107. For example, in some embodiments, a plug-in system organizes, describes, and manages plug-ins that is dedicated to performing various analysis and inferencing tasks. Analysis code (both internal and external) can be configured for execution against a specific program.

Before executing analysis code to implement a received code query, analysis engine 109 can submit a cache query to cache interface module 111. A cache query can request that cache interface module 111 check results cache 112 to determine if valid results for a received code query are cached in results cache 112. If valid results are cached in results cache 112, cache interface module 111 can return the cached results, for example, to the other module that requested the code analysis. Thus, invocation of (potentially resource intensive) analysis code is avoided.

If valid results are not cached in results cache 112, analysis engine 109 can execute analysis code to generate results for the receive code query. Generated results can be sent to cache interface module 111. Cache interface module 111 can cache generated results in results cache 112 such that the generated results can be provided to subsequent instances of the same code query without having to invoke (potentially resource intensive) analysis code.

Cache interface module 111 can include a mechanism for invalidating cached results based on subsequent modification to previously analyzed binary code. For example, cache interface module can include a heuristic for verifying byte-counts and date/time-stamps of binary code. When generated results for specified binary code are to be cached, cache interface module 111 can calculate a byte-count and data/time-stamp for the specified binary code and cache the byte-count and date/time-stamp along with the results in results cache 112. In response to a subsequent cache query (caused by reception of a code query at analysis engine 109) for the cached results, cache interface module 111 can re-calculate a byte-count and date/time-stamp for the specified binary code.

Cache interface module 111 can compare the cached byte-count and cached date/time-stamp to the re-calculated byte-count and re-calculated date/time-stamp respectively. If the cached byte-count and the re-calculated byte-count match (e.g. are the same) and the cached date/time-stamp and the re-calculated date/time-stamp match (e.g., are the same), the cached results are determined to be valid and the cached results are returned as results for a code query. On the other hand, if the cached byte-count and the re-calculated byte-count do not match (e.g., are not the same) and/or the cached date/time-stamp and the re-calculated date/time-stamp (do not match (e.g., are not the same), the cached results are invalidated and cleared from results cache 112.

Cache results can also be invalidated with smaller granularity (even down to a single binary) through dependency analysis.

In some embodiments, invalid results are retained in results cache 112 for some amount of time after the results are invalidated. Accordingly, at a specified time interval or in response to some event, invalidated cached results can be removed from results cached 112.

Figure 2:
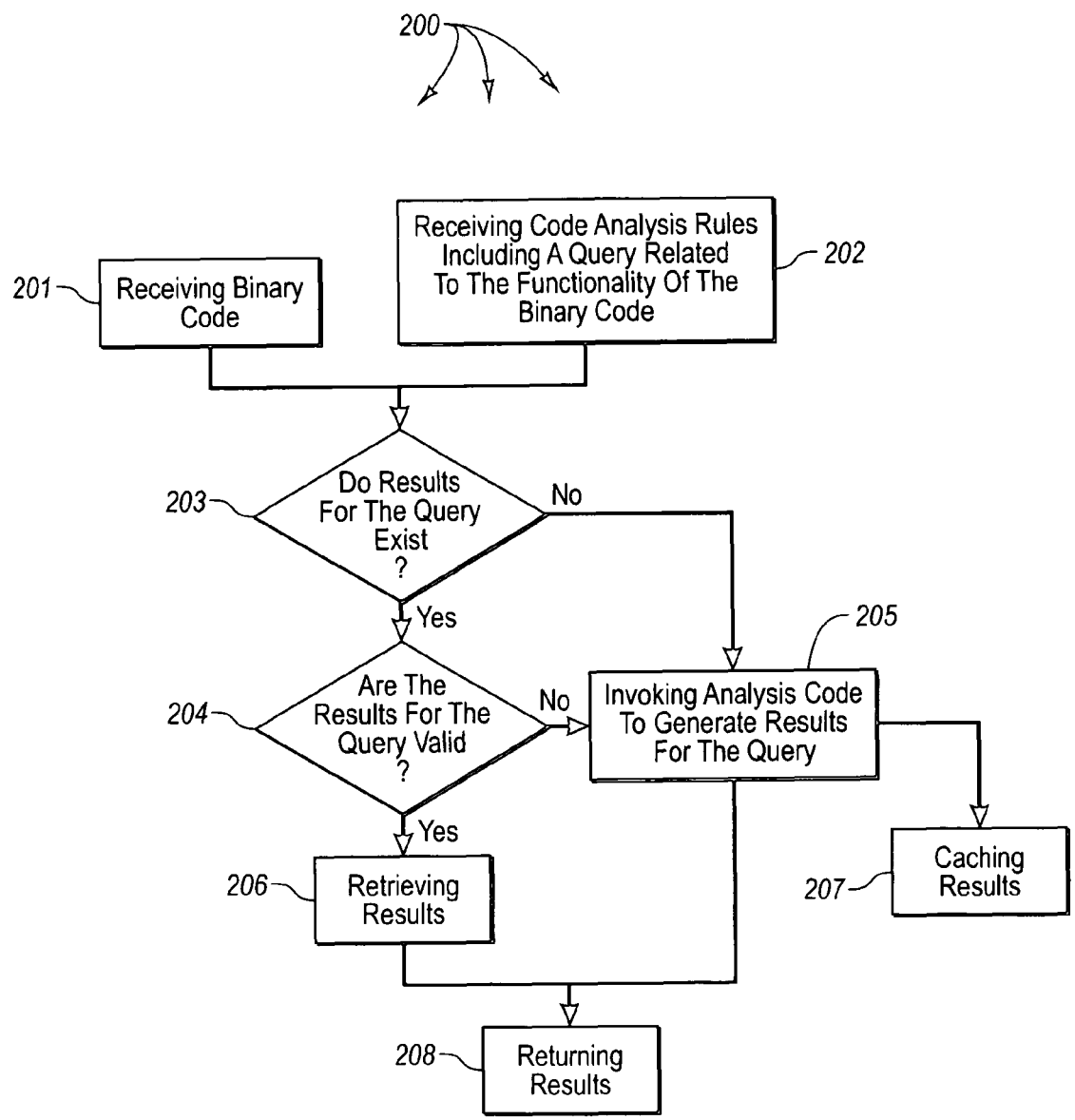
FIG. 2 illustrates a flow chart of an example method for analyzing binary code.

FIG. 2 illustrates a flow chart of an example method 200 for analyzing binary code. Method 200 will be described with respect to the components and data in computer architecture 100.

Method 200 includes an act of receiving binary code (act 201). For example, analysis engine 109 can receive binary code 101. Binary code 101 can include a plurality of procedures, such as, for example, procedures 101A, 101B, and 101C, that interoperate to attempt to implement the designed functionality of binary code 101. For example, procedure 101A can call procedure 101B, procedure 101B can in turn calls procedure 101C, etc. Thus, the appropriate operation of each calling procedure depends on appropriate operation of each other procedure in a chain of calls to the leaf procedures of its call tree. For example, inappropriate operations in procedure 101C (a called procedure) can cause corresponding inappropriate operation in procedure 101A (a calling procedure).

Binary code includes virtually any code that can be executed at a computer system. For example, binary code includes compiled source code instructions of a computer language, such as, for example, C++, C#, Visual Basic, etc., compiled for execution by a processor at a computer system. Binary code also includes intermediate language instructions which are to be further compiled for execution by a virtual machine before being executed by a hardware processor.

Method 200 includes an act of receive code analysis rules including a query related to the functionality of the binary code (act 202). For example, analysis engine 109 can receive analysis rules 102. Analysis rules can include rules for checking a variety of different characteristics of binary code, such as, for example, security settings, conformance with design guidelines, etc., as well as rules indicative of queries related to the functionality of binary code.

For example, analysis rules 102 includes code query 103 indicting a query related to the functionality of binary code 101. Code queries can be implemented by executing analysis code that is externally accessible to code analysis module 107, such as, for example, analysis code 106A, 106B, and 106C included in plug-ins 104A, 104B and 104C respectively. For example, code query 103 can be implemented by executing analysis code 106A from plug-in 104A. Alternately, code queries can be implemented by executing analysis code that is included in code analysis module 107. For example, code query 103 can be implemented by executing analysis code 108.

Method 200 includes determining if results for the query exist (decision block 203). For example, in response to receiving binary code 101 and analysis rules 102, analysis engine 109 can submit cache query 131 to cache interface module 111. In response to cache query 131, cache interface module 111 can determine if cached results for code query 103 of binary code 101 are cached in results cached 112 or if cached results for code query 103 of binary code 101 are not cached in results cache 112.

It may be that as a result of a previous invocation of analysis code (e.g., analysis code 106A or analysis code 108) generated results for code query 103 of binary code 101 were cached in results cache 112. Thus, method 200 can include an act of determining that cached results for the query are cached in a results store. For example, cache interface module 111 can determine that results 123 are cached results for code query 103 of binary code 101. When cached results for a query exist (YES at decision block 203), method 200 proceeds to decision block 204.

On the other hand, it may be that no previous invocation of analysis code generated results for code query 103 of binary code 101. For example, it may be that analysis code 106A or analysis code 108 have never before been invoked for binary code 111. Alternately, it may be that for some reason results from the invocation of analysis code 106A or analysis code 108 are no longed cached in results cache 112. For example, previously stored results may have been flushed from results cache 112.

Thus, method 200 can include an act of determining that cached results for the query are not cached in a results store. For example, cache interface module 111 can determine that results from invoking analysis code 106A (to implement code query 103) against binary code 111 are not cached in results cached 112. When cached results for a query do not exist (NO at decision block 203), method 200 proceeds to act 205.

Method 200 includes determining if results for the query are valid (decision block 204). For example, in response to finding results 123 (for code query 103 of binary code 101), cache interface module 111 can determine if results 123 are valid. Cache interface module 111 can compare data currently representative of binary code 101 (e.g., a current time stamp and a current checksum) to data respesenative of binary code 101 when results 123 were cached (e.g., timestamp 124 and chekcksum 126).

It may be that as a result of the comparison, cache interface module 111 determines that a current time stamp and current checksum match timestamp 124 and checksum 126 respectively. Thus, the method 200 can include an act of determining that the cached results are valid. For example, cache interface module 111 can determine that results 123 are valid. When cached results for a query are valid (YES at decision block 204), method 200 proceeds to act 206.

Method 200 includes an act of retrieving results (act 206). For example, cache interface module 111 can retrieve results 123 from results cache 112.

On the other hand, it may be that as a result of the comparison, cache interface module 111 determines that a current time stamp and/or current checksum do not match timestamp 124 and/or checksum 126 respectively. Thus, the method 200 can include an act of determining that the cached results are not valid. For example, cache interface module 111 can determine that results 123 are not valid. When cached results for a query are not valid (NO at decision block 204), method 200 proceeds to act 205.

Method 200 includes an act of invoking analysis code to generate results for the query (act 205). For example, analysis engine 109 can invoke analysis code 106A against binary code 101 to generate results 113 for code query 103. Analysis code 106A can include code for calculating a closure of exceptions or result codes that can be returned any of procedures 101A, 101B, and 101C, calculate whether any of procedures 101A, 101B, and 101C can possibly return a memory allocation, calculate a call graph for any of procedures 101A, 101B, and 101C, calculate constraints of variables and parameters procedures for any of 101A, 101B, and 101C, determine whether a value may or may not be NULL for any of procedures 101A, 101B, and 101C, aggregate security permissions for binary code 101, etc.

Method 200 includes an act of caching results (act 207). For example, analysis engine 109 can send results 113 to cache interface module 111. Cache interface module 111 can cache results 113 in results cache 112. In some embodiments, analysis code (e.g., analysis code 106A) can indicate to analysis engine 109 and/or cache interface module 111 that its results are suitable for caching. For example, when analysis code is configured to perform frequently repeated analysis the analysis code can include an indication that its results are suitable for caching. In other embodiments, analysis engine 109 and/or caching interface module 111 include additional logic that is executed to determine is analysis results are to be cached.

Analysis engine 109 or cache interface module 111 generate also generate a time stamp and checksum for generated results. For example, analysis engine 109 can generate a time stamp and checksum for results 113 and send the time stamp and checksum (e.g., time stamp 114, and checksum 116) to cache interface module 111 along with results 113. Alternately, cache interface module 111 can generate a time stamp and checksum (e.g., time stamp 114, and checksum 116) for results 113. Cache interface module 111 can cache a time stamp and checksum (whether received or generated) along with cached results. For example, cache interface module 111 can cache time stamp 116 and checksum 116 along with results 113.

Method 200 also includes an act of returning results (act 208). In some embodiments, cache interface module 11 1 returns results. For example, in response to cache query 131, cache interface module 111 can include results 123 in response 132 and return response 123 to analysis engine 109. Alternately or in parallel with response 132, cache interface module 111 can output results 123 (e.g., to a display device).

In other embodiments, analysis engine 109 returns results. For example, subsequent to generating results 113 analysis engine 109 can output results 113 (e.g., to a display device). Alternately, in response to receiving response 132, analysis engine 109 can output results 123 (e.g., to a display device).

Embodiments of the present invention can include a system and Application Program Interface ("API") for requesting answers to analysis questions against target procedures. The API can consult a persisted results store to determine whether analysis results already exist and are valid. If results do not exist or existing results are not valid, the system invokes relevant analysis code on the fly and records and returns generated results to a caller.

In some embodiments, a distinction is made between analysis that is to execute each time and analysis associated with calculating or inferencing answers to expensive analysis questions. The results of analysis that is to execute each time can be cached such that the accessing results of repetitive analysis is more efficient.

Accordingly, embodiments of the present invention establish a formal relationship between analysis and analyzed code. The formal relationship facilitates more powerful code analysis at a developer's computer system in advance of check-in, against a prospective set of code changes, with reduced time-to-analyze costs. Embodiments of the present invention may be particularly useful in environments where a portion of code changes relative to larger body of static code. For example, embodiments can be used to build up a focused cache of results on a local system that provides significant analysis value without compromising performance.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system, the computer system including a plug-in manager for organizing, describing, and managing a plurality of code analysis plug-ins for analyzing binary code, each code analysis plug-in configured for execution against specific binary code, performing a method for analyzing binary code, the method comprising:

an act of receiving binary code;

an act of receiving code analysis rules which include one or more queries related to binary code functionality to be run against the received binary code and a prospective set of code changes for the received binary code;

an act of the plug-in manager loading a code analysis plug-in, from among the plurality of code analysis plug-ins, specifically configured for execution against the received binary code, the loaded code analysis plug-in including analysis code implementing a query of the one or more queries to be run against the received binary code and the prospective set of code changes for the received binary code;

an act of determining that valid results for the query generated by a previous invocation of the analysis code against the received binary code are not cached in a results store prior to invoking the analysis code of the loaded code analysis plug-in;

an act of invoking the analysis code of the loaded code analysis plug-in against the received binary code and the prospective set of code changes to generate results for the query in response to determining that valid results for the query are not cached in the results store;

an act of caching the generated results in the results store such that when the query is to be run against the received binary code in the future the results for the query can be retrieved from the results store without having to invoke the analysis code of the loaded code analysis plug-in; and an act of returning the results for the query.

2. The method as recited in claim 1, wherein the act of receiving binary code comprises an act of receiving at least one of compiled source code and intermediate language instructions.

3. The method as recited in claim 1, wherein the act of receiving code analysis rules comprises an act of receiving code analysis rules for analyzing characteristics of binary code.

4. The method as recited in claim 3, wherein the act of receiving code analysis rules for analyzing characteristics of binary code comprises an act of receiving code analysis rules for analyzing one or more of security settings associated with the binary code, conformance with design guidelines of the binary code, and functionality of the binary code.

5. The method as recited in claim 1, wherein the act of determining that valid results for the query generated by a previous invocation of the analysis code against the received binary code are not cached in a results store comprises an act of determining that there are no results for the query generated by a previous invocation of the analysis code against the received binary code cached in the results store.

6. The method as recited in claim 1, wherein the act of determining that valid results for the query generated by a previous invocation of the analysis code against the received binary code are not cached in a results store comprises an act of determining that invalid results for the query generated by a previous invocation of the analysis code against the received binary code are cached in the results store.

7. The method as recited in claim 6, wherein the act of determining that invalid results for the query generated by a previous invocation of the analysis code against the received binary code are cached in the results store comprises an act of determining that at least one of a time stamp and checksum corresponding to the received binary code differs from a cached time stamp and checksum corresponding to previously generated results for the code query respectively.

8. The method as recited in claim 1, wherein the act of invoking the analysis code of the loaded code analysis plug-in to generate the results for the query comprises an act of analyzing the received binary code to generate one or more of: result codes that can be returned by a function, whether a call site can possibly return a memory allocation, a call graph for a function, constraints of variables and parameters, whether a value may or may not be NULL, and aggregate security permissions.

9. The method as recited in claim 1, wherein the act of caching the generated results in the results store comprises an act of caching the generated results at a results store that is network connectable to the computer system that received the binary code.

10. At a computer system, the computer system including a plug-in manager for organizing, describing, and managing a plurality of code analysis plug-ins for analyzing binary code, each code analysis plug-in configured for execution against specific binary code, performing a method for analyzing binary code, the method comprising:

an act of receiving binary code;

an act of receiving code analysis rules which include one or more queries related to binary code functionality to be run against the received binary code and a prospective set of code changes for the received binary code;

an act of the plug-in manager loading a code analysis plug-in, from among the plurality of code analysis plug-ins, specifically configured for execution against the received binary code, the loaded code analysis plug-in including analysis code implementing a query of the one or more queries to be run against the received binary code and the prospective set of code changes for the received binary code;

an act of determining that cached results for the query are cached in a results store prior to invoking the analysis code of the loaded code analysis plug-in, the cached results having been generated by a prior invocation of the analysis code against the received binary code;

an act of determining that the cached results for the query are valid;

an act of retrieving the cached results to use as results for the query without requiring invocation of the analysis code of the loaded code analysis plug-in; and an act of returning the results for the query.

11. The method as recited in claim 10, wherein the act of receiving binary code comprises an act of receiving compiled source code.

12. The method as recited in claim 10, wherein the act of receiving code analysis rules comprises an act of receiving code analysis rules for analyzing characteristics of binary code.

13. The method as recited in claim 12, wherein the act of receiving code analysis rules for analyzing characteristics of binary code comprises an act of receiving code analysis rules for analyzing one or more of security settings associated with the binary code, conformance with design guidelines of the binary code, and functionality of the binary code.

14. The method as recited in claim 10, wherein the act of determining that cached results for the query are valid comprises act of determining that a time stamp and checksum corresponding to the received binary code match a cached time stamp and checksum corresponding to previously generated results for the code query respectively.

15. The method as recited in claim 10, wherein the act of retrieving the cached results comprises an act of retrieving cached results from a results store that is network connectable to the computer system that received the binary code.

16. A computer system, comprising:
   one or more processors;
   system memory; and
   one or more computer-readable storage media having stored thereon computer-executable instructions for a code analysis module and a plug-in manager, wherein the computer-executable instructions for the plug-in manager are configured to perform the following when executed by the one or more processors:
      organize, describe, and manage a plurality of code analysis plug-ins operable to analyze binary code, each code analysis plug-in configured for execution against a specific binary code; and
      load a code analysis plug-in, from among the plurality of code analysis plug-ins;
   wherein the computer-executable instructions for the code analysis module are configured to perform the following when executed by the one or more processors:
      receive binary code;
      receive code analysis rules which include one or more queries related to binary code functionality to be run against the received binary code and a prospective set of code changes for the received binary code;
      receive the code analysis plug-in loaded by the plug-in manager, the received code analysis plug-in specifically configured for execution against the received binary code, the received code analysis plug-in including analysis code implementing a query of the one or more queries to be run against the received binary code and the prospective set of code changes for the received binary code;
      determine if valid results for the query from a previous invocation of the analysis code against the received binary code are cached in a results store;
      invoke the analysis code against the received binary code and the prospective set of code changes to generate results for the query when valid results for the query are not cached in the results store, and cache the generated results in the results store such that when the query is to be run against the received binary code in the future the results for the query can be retrieved from the results store without having to invoke the analysis code of the received code analysis plug-in;
      retrieve the valid results to use as the results for the query when the valid results for the query are cached in the results store without requiring invocation of the analysis code of the received code analysis plug-in; and
      return the results for the query.

17. The computer system as recited in claim 16, wherein the code analysis module being configured to determine if valid results for the query are cached in a results store comprises the analysis module being configured to determine if a time stamp and checksum corresponding to the received binary code match a cached time stamp and checksum corresponding to previously generated results for the code query respectively.

18. The computer system as recited in claim 16, the code analysis module including an analysis engine and a cache interface module, wherein the code analysis module being configured to return the results for the query comprises the cache interface module being configured to return results to the analysis engine.

* * * * *